United States Patent [19]

Asano

[11] Patent Number: 5,447,397

[45] Date of Patent: Sep. 5, 1995

[54] APPARATUS FOR FIXING AN ANNULAR CUTTER TO AN ARBOR

[75] Inventor: Osamu Asano, Tokyo, Japan

[73] Assignee: Nitto Kohki Co., Ltd., Tokyo, Japan

[21] Appl. No.: 187,516

[22] Filed: Jan. 28, 1994

[30] Foreign Application Priority Data

Feb. 18, 1993 [JP] Japan .................. 5-010567 U

[51] Int. Cl.6 .................. B23B 51/06; B23B 51/04
[52] U.S. Cl. .................. 408/59; 279/82; 408/204
[58] Field of Search .................. 279/76, 82, 704; 408/204, 239 R, 240, 57, 59; 409/232, 234

[56] References Cited

U.S. PATENT DOCUMENTS

| 4,624,608 | 11/1986 | Shiomi et al. | 408/204 |
| 4,688,975 | 8/1987 | Palm | 409/232 |
| 4,701,083 | 10/1987 | Deutschenbaur et al. | 279/82 |

FOREIGN PATENT DOCUMENTS

| 8605002 | 5/1986 | Germany. |
| 62-74515 | 4/1987 | Japan. |
| 2141659 | 1/1985 | United Kingdom. |

Primary Examiner—Steven C. Bishop
Attorney, Agent, or Firm—Nixon & Vanderhye

[57] ABSTRACT

An apparatus for fixing an annular cutter to an arbor comprises an arbor and a rotation transmitting member coaxially fixed to the arbor. Inclined grooves which receives locking pins extend from the inner peripheral surface to the outer peripheral surface of the rotation transmitting member toward the arbor. A guide ring is axially slidably mounted on the rotation transmitting member and has pressing faces and restricting grooves defined by the pressing faces. Each restricting groove has a dimension which can receive the respective locking pin. A holding mechanism is provided for holding the guide ring in a normal state in which the pressing faces press the locking pins inward along the inclined grooves. The holding mechanism can moved toward the arbor together with the guide ring so as to allow the locking pins to enter the restricting grooves. An annular cutter has a cutter body and a shank connected to the cutter body and inserted into said rotation transmitting member. The outer cylindrical surface of the shank is formed with an annular engaging groove which aligns the inclined grooves when the said shank is fully inserted in the rotation transmitting member.

4 Claims, 3 Drawing Sheets

APPARATUS FOR FIXING AN ANNULAR CUTTER TO AN ARBOR

BACKGROUND OF THE INVENTION

1. Field of the Invention

The present invention relates to an apparatus for fixing to and removing from an arbor an annular cutter for forming at least one relatively deep hole in a workpiece made of a hard material such as steel, and more particularly to an apparatus for fixing an annular cutter to an arbor easily in one touch operation.

2. Description of the Related Art

As known well, a drilling machine for drilling workpieces made of a hard material generally rotates and feeds, at a constant speed, an annular cutter provided with on its lower circular edge with cutting blades for forming a hole or holes in each workpiece. Before new drilling operation is performed with a drilling machine, the annular cutter now on the machine must be replaced by new one which has the same outer diameter as the inner diameter of holes to be formed in the workpiece. For easy replacement of the annular cutter, there have been developed various apparatus for fixing an annular cutter to or detaching the same from an arbor.

A typical example of such a conventional apparatus for fixing an annular cutter to and detaching the same from an arbor is disclosed in Japanese Laid-open Patent Application No. 62-74515.

In this conventional annular-cutter fixing apparatus, a rotation transmitting member is inserted in the axial bore formed in the lower end portion of an arbor and is fixed to the arbor by a key. An operation sleeve urged downward by a first spring is axially slidably mounted on the lower end portion of the rotation transmitting member. An annular engaging portion is formed in the lower end portion of the operation sleeve and urged downward by a second spring so that the annular engaging portion inwardly presses balls in engaging holes radially extending through the rotation transmitting member in such a manner that a part of each ball projects inward from the inner wall of the rotation transmitting member.

The ways how to fix an annular cutter to and detach the same from the arbor in this conventional apparatus will be explained.

The operation sleeve is lifted against the first spring and the annular engaging portion is displaced away from the outer opening of the engaging holes to make the balls free. Next, the shank of an annular cutter is inserted into the axial bore of the rotation transmitting member from its lower end. The outer wall of the shank presses the balls into the engaging holes, and the shank is continued to be inserted into the rotation transmitting member until an annular engaging groove formed in the outer wall of the shank aligns with the inner opening of the engaging holes. When the operation sleeve is released in this state and lowered, the annular engaging portion engages the balls and pushes them inward, and the balls engage the annular engaging grooves in the shank, whereby the annular cutter is fixed to the arbor.

On the other hand, the operation sleeve is lifted against the second spring with an annular cutter fixed to the arbor, and the annular engaging portion is displaced from the outer opening of the engaging holes so that the balls are made free again in the engaging holes. Then, the shank of the annular cutter is pulled off the rotation transmitting member. Thereafter, the operation sleeve is released to be returned to the normal position. In doing so, the arbor is removed from the operation cutter.

When, however, the annular cutter is fixed to the drilling machine which is provided with the conventional annular cutter fixing apparatus, the operation sleeve is pushed against the second spring with one hand of the operator, and, at the same time, the shank of the annular cutter is inserted into the rotation transmitting member by the other hand. The operator must use both hands in order to fix the annular cutter to the arbor. Thus, the cutter cannot be fixed to drilling machine in one touch operation with a single hand in a simple way without accompanying rotation of the annular cutter.

SUMMARY OF THE INVENTION

The object of the present invention is to provide a novel annular cutter fixing apparatus in which an annular cutter is fixed to an arbor in one touch operation with a single hand of the operator without accompanying rotation of the annular cutter, thereby solving the above-mentioned problems.

In order to achieve the object, the present invention provides an apparatus for fixing an annular cutter to an arbor comprising:

an arbor;

a rotation transmitting member coaxially fixed to the arbor and having inclined grooves extending from the inner peripheral surface to the outer peripheral surface of the rotation transmitting member toward the arbor;

locking pins received by the inclined grooves a guide ring axially slidably mounted on the rotation transmitting member and having pressing faces and restricting grooves defined by the pressing faces, each of the restricting grooves having a dimension which can receive respective one of the locking pins a holding mechanism for holding the guide ring in a normal state in which the pressing faces press the locking pins inward along the inclined grooves, the holding means being capable of being moved toward the arbor together with the guide ring so as to allow the locking pins to enter the restricting grooves; and an annular cutter including a cutter body and a shank inserted into the rotation transmitting member, the shank being connected to an end of the cutter body and having an outer cylindrical surface formed with an annular engaging groove which aligns with the inclined grooves when the shank is fully inserted in the rotation transmitting member.

The shank of an annular cutter will be fixed to the rotation transmitting member in the following way.

As the shank of the annular cutter is inserted into the axial bore of the rotation transmitting member, the locking pins are pushed radially outward by the shank. The locking pins move along the inclined grooves outward by translating the guide ring axially toward the arbor against the biasing force of the holding mechanism. When the rotation preventing projection of the shank is fitted in the rotation preventing hole of the rotation preventing member by rotating the annular cutter around its own axis, the annular engaging groove of the shank coincides with the inner openings of the inclined grooves of the rotation transmitting grooves. The locking pins are pushed in the engaging groove and received thereby by the urging force of the holding mechanism, whereby the annular cutter is fixed to the arbor by the rotation transmitting member.

The shank of the annular cutter will be removed from the rotation transmitting member in the following way.

When the operation sleeve is moved upward, the locking pins are pushed by the operation sleeve to be moved outward in the inclined grooves, and the guide ring is also moved upward against the biasing force of the holding mechanism. As the annular cutter is pulled of off the rotation transmitting member, the locking pins are moved outward and disengaged from the engaging groove of the shank, whereby the annular cutter can be removed from the rotation transmitting member easily.

DETAILED DESCRIPTION OF A PREFERRED EMBODIMENT

A preferred embodiment of the present invention will be described with reference to the accompanying drawings.

Figure 1:
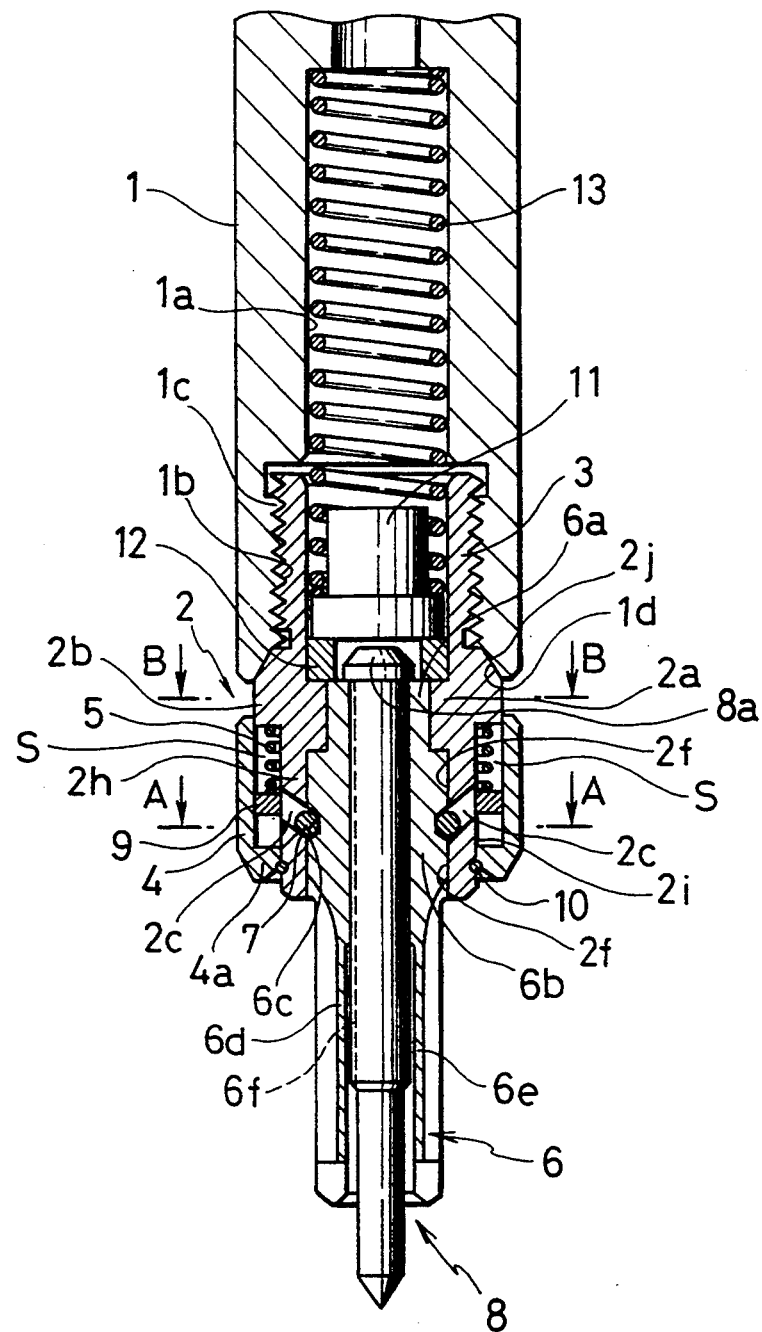
FIG. 1 is a longitudinal cross-sectional view of an annular cutter fixing apparatus according to one embodiment of the present invention.
Figure 2:
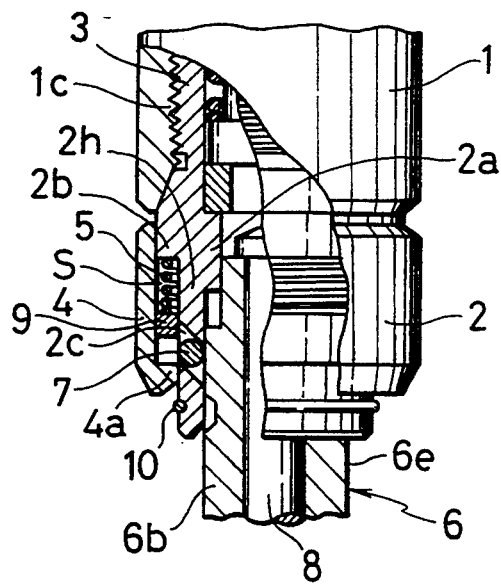
FIG. 2 is a partial cross-sectional view of the main part of the cutter fixing apparatus in a state in which an annular cutter is fixed to an arbor.
Figure 3:
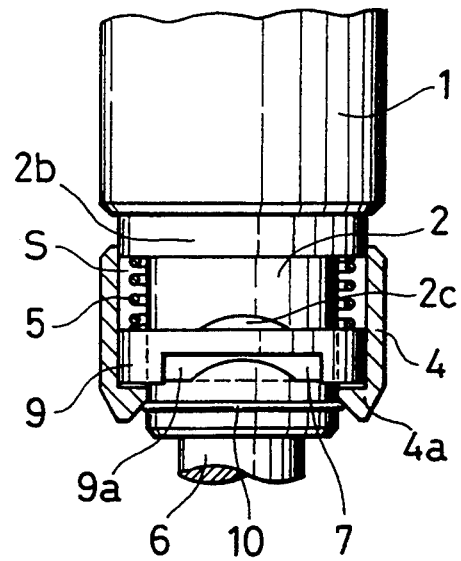
FIG. 3 is a lateral side view of the main part of the cutter fixing apparatus with the operation sleeve cross sectioned.

As shown in FIGS. 1 to 3, an arbor 1 is fixed to a drilling machine (not shown) so that rotation and Feed required for drilling operation are transmitted from the drilling machine to the arbor 1. In the lowe end portion of the arbor 1 are formed a small diameter axial bore 1a and a large diameter axial bore 1b continuous to the small diameter axial bore 1a. Lubricant is supplied from the outside of the arbor into the bores 1a and 1b through an oil passage (not shown).

Figure 7:
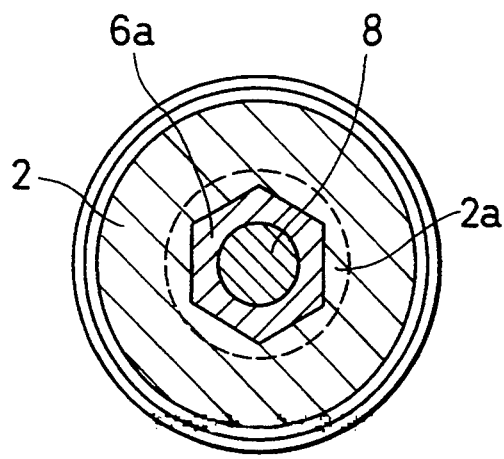
FIG. 7 is a cross-sectional view along line B—B of FIG. 1.

As shown in FIGS. 1 and 3, a male screw 3 formed in the outer periphery of a cylindrical rotation transmitting member 2 engages a female screw 1c formed in the inner periphery of the lower end portion of the arbor 1 in the large diameter axial bore 1b in the lower end portion of the arbor 1 in such a way that the rotation transmitting member 2 is irrotationally connected to the lower end portion of the arbor 1. In order to coaxially align the rotation transmitting member 2 with the arbor 1 when the member 2 is fixed to the arbor 1, tapered portions 1d and 2j are formed on the inner edge portion of the lower end of the arbor 1 and the outer edge portion of an intermediate portion of the rotation transmitting member 2, respectively. On an intermediate portion of the inner peripheral surface 2f of the rotation transmitting member 2 is formed an inward extending flange portion 2a having a regularly hexagonal rotation preventing hole 2g (FIGS. 4A and 4B) also used for supporting a seal member 12 which will be described later. The regularly hexagonal hole 2g can also used for tightening the rotation transmitting member 2 to the arbor 1. As shown in FIG. 7, a front portion of the shank 6b of an annular cutter 6 constitutes a rotation preventing projection 6a having a regularly hexagonal cross section which is complementary to the regularly hexagonal rotation preventing hole 2g of the inward extending flange portion 2a of the rotation transmitting member 2 and is inserted into the regularly hexagonal rotation preventing hole 2g so that the annular cutter 6 is prevented from rotating with respect to the rotation transmitting member 2. However, the cross section of the rotation preventing hole 2g is not limited to a regularly hexagonal shape but may be another regularly polygonal shape. When the shape of the rotation preventing projection 6a of the shank 6b is regularly polygonal (in this case, regularly hexagonal), the annular cutter 6 can easily be set in position by being rotated through a small angle. On the upper end of the inward extending flange portion 2a is provided the seal member 12 against which a valve body 11 is pressed downward by a compression coil spring 13 in the small diameter axial bore 1a. In the state shown in FIG. 1, lubricant supplied in the range of the large diameter axial bore 1b does not flow down therefrom. When, however, the valve body 11 is pushed upward against the biasing force of the compression coil spring 13, the lubricant flows downward.

Figure 4A:
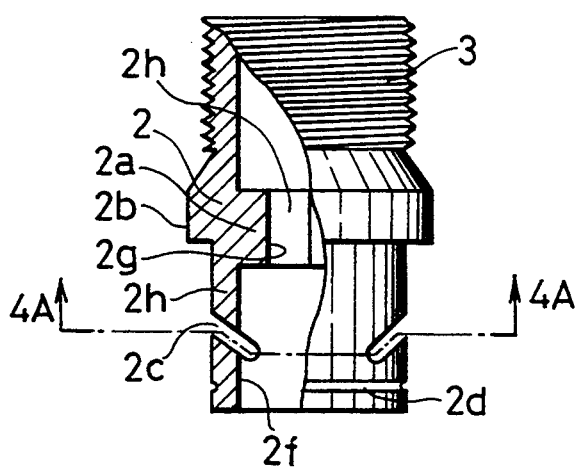
FIG. 4A is a partial cross-sectional view of a rotation transmitting member.
Figure 4B:
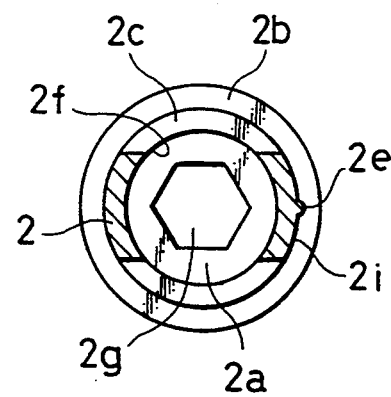
FIG. 4B is a cross-sectional view of the rotation transmitting member along line 4A—4A of FIG. 4A.
Figure 5A:
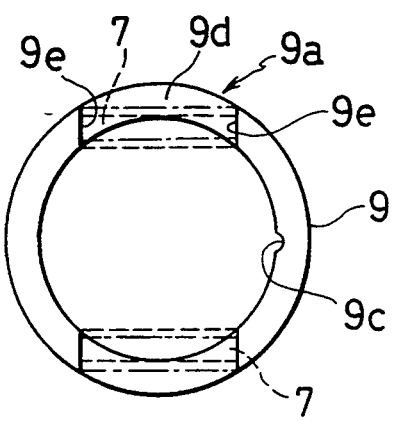
FIG. 5A is a front view of a guide ring used in the embodiment as shown in FIG. 1.
Figure 5B:
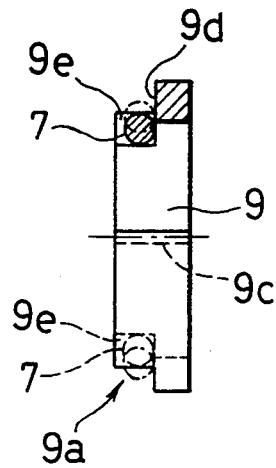
FIG. 5B is a lateral side view of the guide ring with the upper half cross sectioned.
Figure 5C:
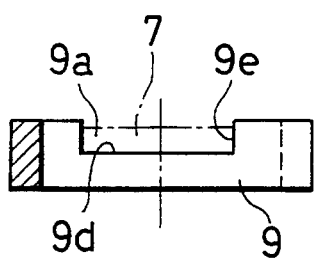
FIG. 5C is another lateral side view of the guide ring with the left half cross sectioned.

Referring to FIG. 4A, a shoulder 2b also used as a spring seat of a compression coil spring 5 disposed in the operation sleeve 4 as will be described later is formed on an intermediate portion of the outer peripheral surface of the rotation transmitting member 2. A pair of inclined through grooves 2c extending inward downward are formed in an intermediate portion of a cylindrical barrel portion 2h extending downward from the shoulder 2b so as to be symmetrical with respect to the rotation transmitting member 2. The inclined grooves 2c receive corresponding locking pins 7 so that the pins 7 can move along the inclined grooves 2c. In a portion of the outer peripheral surface of the barrel portion 2h lower than the inclined grooved 2c is formed an annular groove 2d for receiving a later-described ring 10 for preventing a later-described operation sleeve 4 from slipping off the rotation transmitting member 2. As shown in FIG. 4B, a projection 2e is formed on the outer peripheral surface 2i of the rotation transmitting member 2. The projection 2e engages an axial groove 9c formed in the inner peripheral surface of a guide ring 9 as will be described later so as to prevent the guide ring 9 from rotating. However, any engaging means may be used instead so long as the rotation of the guide ring 9 is prevented.

Referring to FIGS. 1 and 2, the operation sleeve 4 is axially slidably mounted on the lower end portion of the rotation transmitting member 2. An inward extending flange 4a is formed on the lower end of the operation sleeve 4 and is prevented from slipping off the rotation transmitting member 2 by the slipping-off preventing ring 10. The guide ring 9 is axially movably disposed in a space S defined between the outer peripheral surface of the barrel portion 2h of the rotation transmitting member 2 and the inner peripheral surface of the operation sleeve 4. The ring 10 normally abuts against the inward extending flange 4a of the operation sleeve 4. The operation sleeve 4 is normally urged downward via the guide ring 9 by means of the compression coil spring 5 disposed in the space S and stretched between the shoulder 2b of the rotation transmitting member 2 and the upper end of the guide ring 9.

As shown in FIGS. 3 and 5A to 5C, a pair of restricting grooves 9a are formed in the outer periphery of guide ring 9 so as to be arranged symmetrical with the axis of the guide ring 9. Each restricting groove 9a is defined by a pressing face 9d and parallel end faces 9e formed in the lower portion of the guide ring 9. The pressing face 9d is perpendicular to the axis of the guide ring 9. The end faces 9e are parallel with the axis of the guide ring 9 and separated from each other. The length of the locking pin 7 is substantially equal to that of the distance between the end faces 9e in each restricting groove 9a, so that the locking pin 7 is prevented from displacing sidewise. In the inner peripheral surface of the guide ring 9 are formed the axial groove 9c which receive the projection 2e.

In a state in which the guide ring 9 mounted on the rotation transmitting member 2, the guide ring 9 is normally urged downward by the compression spring 5, whereby the locking pins 9 inserted in the inclined grooves 2c of the rotation transmitting member 2 are also urged downward by the pressing faces 9d defining the restricting grooves 9a of the guide ring 9.

Figure 6:
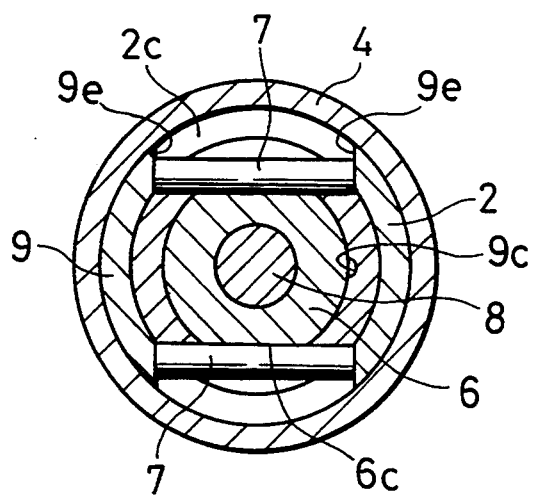
FIG. 6 is a cross-sectional view along line A—A of FIG. 1.

When the shank 6b of the annular cutter 6 is completely fixed to the rotation transmitting member 2 or fully pulled out thereof, the locking pins 7 are pushed by the pressing faces 9d under the urging force of the compression coil spring 5 so as to be placed at the deepest portions of the inclined grooves 2c, as shown in FIGS. 1 and 6. In this state, the locking pin 7 is placed at the position shown by a solid circle in the upper half in FIG. 5B. When the shank 6b of the annular cutter 6 is completely fixed to the rotation transmitting member 2, the locking pins 7 are received by an annular groove 6c formed in the outer peripheral surface 2e of the shank 6b in such a manner that the shank 6b does not slip off the rotation transmitting member 2.

When an outward force is applied to the locking pins 7, they can move outward along the inclined grooves 2c by lifting the guide ring 9 against the biasing force of the compression coil spring 5. Further, as the operation sleeve 4 together with the ring 9 is moved against the biasing force of the compression coil spring 5 from the state shown in FIG. 1 to the state shown in FIG. 2, the locking pins 7 can move freely outward in the inclined grooves 2c.

A plurality of blades (not shown) are separately or integrally formed on the circular open lower end of a hollow cylindrical cutter body 6d of the annular cutter 6 so as to be arranged circumferentially at intervals. The front portion (the rotation preventing portion 6a) of the shank 6b coaxially extends from the other end of the cutter body 6d of the annular cutter 6. As described above, the shank 6b has a rotation preventing projection 6a having a regularly hexagonal cross section. The rotation transmitting member 2 is provided with the inward extending flange portion 2a formed with a regularly hexagonal rotation preventing hole 2g. When the shank 6b is fully inserted into the rotation transmitting member 2, the rotation preventing projection 6a of the shank 6b engages the rotation preventing hole 2g of the rotation transmitting member 2, whereby rotation of the rotation transmitting member 2 is transmitted to the annular cutter 6. A center pin 8 for determining the center of a to-be-drilled hole in a workpiece extends through the central portion of the annular cutter 6. The center pin 8 is provided on its upper end with a head 8a whose neck portion abuts against the upper end of the annular shank 6b so that the center pin 8 does not slip off the rotation transmitting member 2 downward. A lubricant axial groove 6f is formed in the outer peripheral surface of the barrel portion of the center pin 8 so that the groove 6f conducts the lubricant from the large diameter bore 1b to the blades of the annular cutter 6 when the center pin 8 is moved upward. When the tip of the center pin 8 is worn out, it is taken out of the shank 6b after having been removed from the rotation transmitting member 2 and can be replaced by new one easily. Since the arbor and the annular cutter fixing apparatus are separately provided, the components of the annular cutter fixing apparatus can be machined easily.

The operation of the apparatus of this embodiment will be described.

As shown in FIG. 1, the rotation transmitting member 2 is irrotationally connected to the arbor 1, and the valve body 11 is pressed against the seal member 12 between the arbor 1 and the rotation transmitting member 2 by the biasing force of the compression coil spring 13. The rotation transmitting member 2 is provided with the locking pins 7, the guide ring 9, the compression coil spring 5 and the operation sleeve 4.

The operation how to fix the annular cutter 6 to the rotation transmitting member 2 will be described.

As the shank 6b of the annular cutter 6 is inserted into the axial bore 2f of the rotation transmitting member 2, the locking pins 7 are pushed outward by the outer peripheral surface 6e of the shank 6b. Thus, the locking pins 7 in contact with the pressing faces 9a by the pressing force move the guide ring 9 upward against the biasing force of the compression coil spring 5 and moves outward along the inclined grooves 2c. At the same time, the annular cutter 6 is rotated around its axis so as to align the regularly hexagonal rotation preventing projection 6a of the shank 6b with the regularly hexagonal rotation preventing hole 2g. When the rotation preventing projection 6a of the annular cutter 6 is fully inserted into the rotation preventing hole 2g, the annular groove 6c formed in the shank 6b aligns with the corresponding locking pins 7. The locking pins 7 are pressed inward by the biasing force of the compression coil spring 5 and received by the annular groove 6c. As a result, the annular cutter 6 is fixed to the rotation transmitting member 2 by the locking pins 7 received by annular groove 6c.

In this way, the annular cutter 6 is securely fixed to the rotation transmitting member 2 in one touch operation merely by inserting the annular cutter 6 into the rotation transmitting member 2 by one hand of the operator. The rotation of the feed necessary for drilling operation is transmitted from the drilling machine to the annular cutter 6 through the arbor 1. During the drilling operation, the center pin 8 is pushed upward and separates the valve member 12 from the seal member 12 to supply lubricant in the bore 1a to the blades of the annular cutter 6 through the lubricant groove 6f.

The operation how to remove the annular cutter 6 from the rotation transmitting member 2.

The operation sleeve 4 is moved upward from the position as shown in FIG. 1. The both ends of each locking pin 7 are pressed by the inward extending flange 4a of the operation sleeve 4 and the locking pins 7 are moved outward in the inclined grooves 2c. Due to the outward movement of the locking pins 7, the guide ring 9 is moved upward against the urging force of the compression coil spring 5. As the annular cutter 6 is pulled downward in this condition, therefore, the annular cutter 6 can be pulled off the rotation transmitting member 2 easily together with the center pin 8. Thus, the center piece 8 whose center point is worn out can be easily replaced after the annular cutter 6 has been taken out of the rotation transmitting member 2.

The present invention is not limited to the above-mentioned embodiment but is applicable to various applications within the scope of the present invention.

What is claimed is:

1. An apparatus for fixing an annular cutter to an arbor comprising:
   (a) an arbor having one end portion formed therein with a tapered portion and an intermediate portion formed therein with connecting means;
   (b) a rotation transmitting assembly comprising,
      (i) a rotation transmitting member having an end portion formed thereon with connecting means which can be connected coaxially with said connecting means of said arbor, an intermediate inward extending flange portion having a tapered portion for causing said rotation transmitting member to coaxially align said arbor when said tapered portion of said rotation transmitting member engages said tapered portion of said arbor, an inner peripheral surface, an outer peripheral surface, and inclined grooves extending from said inner peripheral surface to said outer peripheral surface toward said end portion of said rotation transmitting member,
      (ii) locking pins received by said inclined grooves,
      (iii) a guide ring axially slidably mounted on said rotation transmitting member and having pressing faces and restricting grooves defined by said pressing faces, each of said restricting grooves having a dimension which can receive respective one of said locking pins, and
      (iv) holding means for holding said guide ring in a normal state in which said pressing faces press said locking pins inward along said inclined grooves, said holding means being capable of being moved toward said arbor together with said guide ring so as to allow said locking pins to enter said restricting grooves,
   (c) a seal member housed in said end portion of said rotation transmitting member and abutting against said intermediate inward extending flange portion;
   (d) a valve member housed in said end portion of said rotation transmitting and abutting against said seal member;
   (e) urging means disposed between said arbor and said valve member, for pressing said seal member against said intermediate inward extending flange portion through said valve member;
   (f) said connecting means of said rotation transmitting member being coaxially connected to said connecting means of said arbor after said seal member, said valve member and said urging means have been assembled into said rotation transmitting assembly, and
   (g) an annular cutter including a cutter body having two ends and a shank inserted into said rotation transmitting member, said shank having an outer cylindrical surface and two ends, one end being connected to one of said two ends of said cutter body, said outer cylindrical surface of said shank being formed with an annular engaging groove which aligns said inclined grooves when said shank is fully inserted in said rotation transmitting member.

2. The apparatus according to claim 1, wherein said holding means comprises:
   an operation sleeve housing said guide ring and having an inward extending flange portion formed at an end thereof which is remote from said arbor and always engages said guide ring, said operation sleeve being movable axially on said rotation transmitting member between a first position at which said locking pins is disposed at the deepest portion of each of said inclined grooves and a second position at which said locking pins are received by said restricting grooves; and
   a spring for biasing said guide ring toward said inward extending flange portion of said operation sleeve.

3. The apparatus according to claim 1, further including rotation preventing means which comprises an inward flange portion formed on an intermediate portion of said inner peripheral surface of said rotation transmitting member and formed with a rotation preventing hole, and a rotation preventing projection formed at the other end of said shank fitted in said rotation preventing hole.

4. The apparatus according to claim 3, wherein said rotation preventing hole has a regularly polygonal cross section, and said rotation preventing projection has a regularly polygonal cross section complementary to said regularly polygonal cross section of said rotation preventing hole.

* * * * *